UNITED STATES PATENT OFFICE.

WILLIAM H. TOWERS, OF BOSTON, MASSACHUSETTS.

IMPROVEMENT IN MINERAL PAINTS.

Specification forming part of Letters Patent No. 124,772, dated March 19, 1872.

*To all whom it may concern:*

Be it known that I, WILLIAM H. TOWERS, of Boston, in the county of Suffolk and State of Massachusetts, have made a new and useful Improvement in the Manufacture of Mineral Paints; and I do hereby declare the following to be a full and exact description of the same.

The basis of my improvement in mineral paints is coal-ashes; and the invention consists in preparing the coal-ashes so as to form the body of a paint, and in preparing paints from the same by combining this base with oil or other suitable articles, and with other paint bases and pigments or coloring materials.

The following description will enable others skilled in the art to make and use my invention:

I take the common coal-ashes, such as is produced in large quantities from the combustion of mineral coal, and sift it through a wire seive or screen, to separate any lumps of coal or cinder, and leave a clear, fine powder. This fine powder is then ground to an impalpable powder in a suitable mill, such as used for grinding quartz, barytes, and the like.

The flour or fine powder thus produced is suitable for the basis of paints, and itself constitutes a new article of manufacture, either in the dry state or combined with other material to form useful products, for which it is superior to the ordinary mineral paints, ochres, and the like.

It may be ground in oil in the same manner as lead, oxide of zinc, and, where the color is to be changed, combined with pigments. Any of the known paint vehicles or substitutes for linseed-oil may be employed in forming my mineral paint.

It makes a very hard durable paint, which will take a high polish, and when mixed with oxide of zinc gives it greater body.

Having thus described my invention, what I claim, and desire to secure by Letters Patent of the United States, is—

1. The improved mineral paint herein described, made by treating coal-ashes substantially as herein set forth.

2. The paint compounds herein described, produced by combining prepared coal-ashes with oil or other articles, either with or without the addition of pigments.

WM. H. TOWERS. [L. S.]

Witnesses:
C. A. PEASE,
JOS. H. WHITMAN.